UNITED STATES PATENT OFFICE.

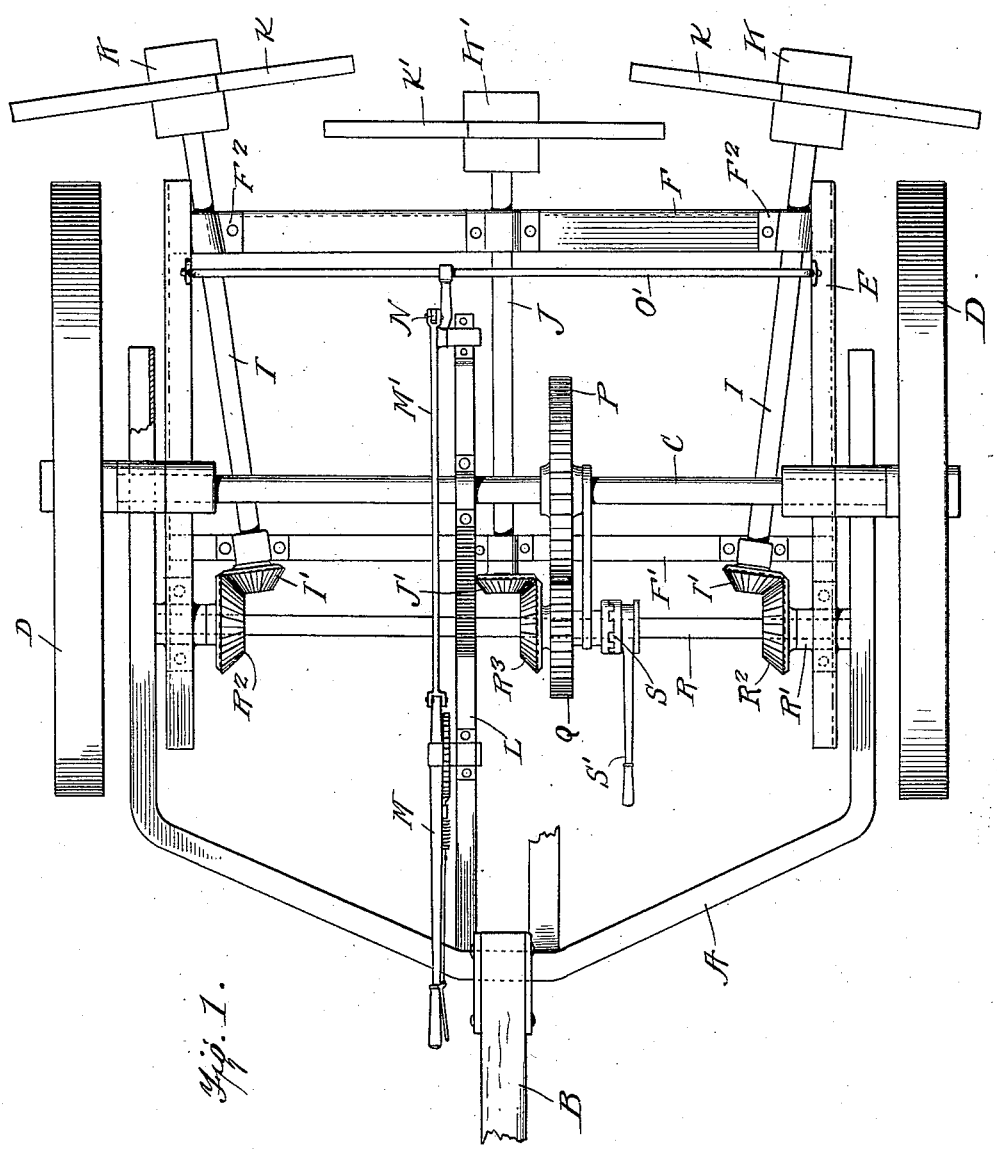

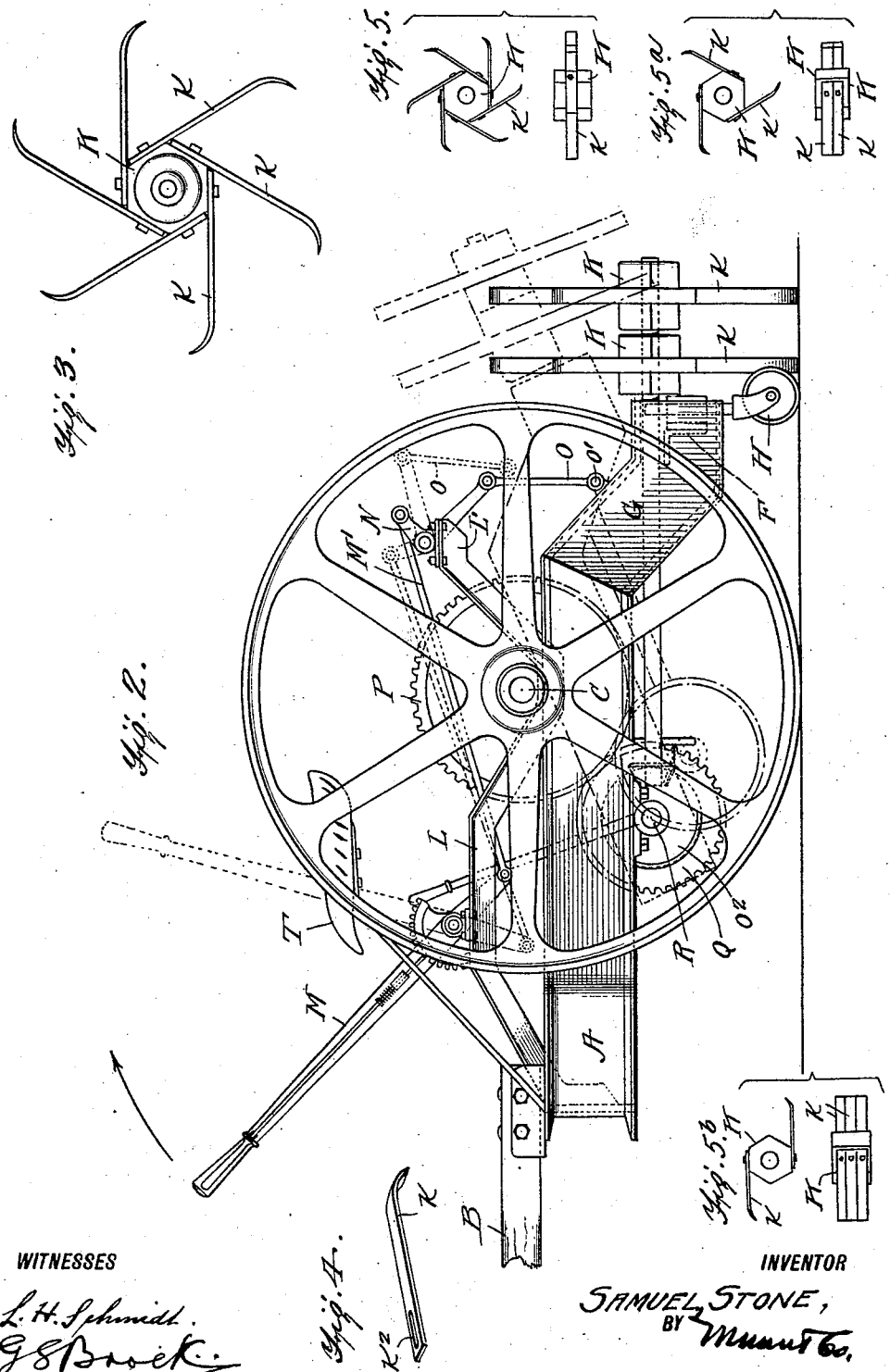

SAMUEL STONE, OF MILES CITY, MONTANA.

THINNING-MACHINE.

1,016,110. Specification of Letters Patent. Patented Jan. 30, 1912.

Application filed May 29, 1911. Serial No. 630,040.

*To all whom it may concern:*

Be it known that I, SAMUEL STONE, a citizen of the United States, and a resident of Miles City, in the county of Custer, State of Montana, have invented a new and useful Improvement in Thinning-Machines, of which the following is a specification.

My invention relates to improvements in machines for thinning or cutting out the superfluous plants of such character as are "drilled" and planted in rows, and has for its object to provide a machine for expeditiously and efficiently thinning and cutting such plants, it being intended more particularly for onions, beets and plants that are allowed to grow to maturity at short intervals to one another, but may be used for cotton plants.

My invention consists in certain novel features of construction, arrangement and combination of parts as will be hereinafter fully described and pointed out in the claims, reference being had to the accompanying drawings, in which:

Figure 1 is a top plan view of my device; Fig. 2 is a side elevation of the same; Fig. 3 is a view of one of the thinning or blocker heads. Fig. 4 is a perspective view of one of the blocker knives. Figs. 5, 5$^a$ and 5$^b$ are detail views showing various arrangements of the blocker knives.

In carrying out my invention I use a front frame A made of channel iron supporting at its front the tongue B and supporting at its rear end the axle C which carries the ground wheels D at the ends. Another frame consisting of the side channel bars E and the rear bar F is pivotally suspended from the axle and the rear ends deflected downwardly as shown at G. The rear cross bar F carries the caster wheels H which support the rear end of the frame when in use, said cross bar F having journaled at each end a shaft I and at its center the shaft J. The shafts I extend forwardly and slant inwardly, as shown in Fig. 1, and are journaled near their forward ends on a front cross bar F' which extends to the side bars E. At the forward ends of the shafts I, I and J are secured the bevel gears I' and J', the purpose of which will presently appear. To the rear ends of the shafts I and J are secured the blocker heads or knife carriers K and K', said heads having a central opening to fit the shafts I and J and having a hexagonal outer contour, see Fig. 3. To each of these heads are secured the spring steel blocker knives or cutters $k$ and $k'$ which are slotted near one end at $k^2$ to allow them to be adjusted on their heads when their cutting edges wear. Each knife is secured to the head and extends a certain distance in a straight line slightly thinned where they are curved, then thickened and sharpened to a cutting edge. These knives may be used one on each side of the hexagon, two on each alternate side or three on each of two opposite sides of the hexagon, according to the number and width of the spaces wished to be cut out.

The bearings F$^2$ for the shafts I and J are preferably made movable so as to adjust the width of the machine to the width the rows may stand apart.

Mounted on the axle C is a longitudinal beam L which is connected at its front end to front bar A of the main frame, and said beam supports a pivoted lever M which is controlled by a quadrant rack and locking pin of an ordinary type.

To the lower end of lever M is pivotally secured a connecting bar M' which extends rearwardly and is connected to a bell crank or rocker lever N mounted on an upward extension L' of the beam L. Said bell crank lever N is in turn connected to a link O from which is suspended the cross bar O' connected at its ends to the side bars E E of the frame which carries the shafts and the caster wheels H. By means of the lever and the connecting rod and bell crank lever the rear end of the frame carrying the knives may be raised and lowered at will. A gear wheel P is mounted on the axle of the ground wheels, said gear P meshing with another gear wheel Q mounted on the transverse shaft R mounted at each end in suitable bearings R' secured to the rear frame of the machine. The shaft R also carries the bevel gears R$^2$ and R$^3$ which mesh with the bevel gears I' J' on the front ends of the shafts I, I and J, respectively, the bevel gears being brought into action by the gear Q meshing with gear P through the agency of the clutch S which can be operated by a rod S' from the driver's seat T. When it is desired to transport the machine without using the knives, the rear end of the rear frame carrying said knives is elevated as indicated in dotted lines in Fig. 2.

From the above it will be seen that my device has great adaptability and will operate on three rows at a time. The six knives on each shaft are of such width and so geared as to leave a space of about ¾ of an inch of the drilled product untouched; or these untouched distances of soil can be made farther apart by putting all the knives on opposite sides of the head K and K', that is, three on each side.

I claim:

1. In a machine of the class described, the combination of a front frame and a rear frame, an axle supporting said frames, longitudinal shafts mounted at each side and the center of the rear frame and provided at their rear ends with blocker heads and at their front ends with gears the central blocker head positioned in advance of the side blocker heads, said side blocker heads being disposed obliquely to the central blocker head, a transverse shaft mounted on the front end of the rear frame and having gears mounted thereon adapted to mesh with the gears at the front ends of the longitudinal shafts, a pinion mounted on the axle, a pinion loosely mounted on the transverse shaft and meshing with the pinion on the axle, a clutch for throwing said pinions into and out of action, and means for actuating said clutch.

2. In a machine of the class described, the combination of a front frame, and a rear frame, an axle supporting said frames independently, longitudinal shafts mounted at each side and at the center of the rear frame, the side shafts converging forwardly and having bevel gears at their forward ends, and blocker heads at their rear ends carrying thinning knives, a transverse shaft mounted on the front end of the rear frame and carrying bevel gears meshing with the bevel gears on the forward ends of the longitudinal shafts, a pinion on the axle, another pinion loosely mounted on the transverse shaft adapted to engage the pinion on the axle, a clutch for controlling and operating said pinions, a longitudinal beam suspended from the axle and secured at its forward end to the front frame, a quadrant controlled lever mounted on said beam adjacent to the seat of the machine, and means controlled by said lever for elevating or depressing the rear of the rear frame.

3. In a machine of the class described, the combination of a front and rear frame, an axle independently supporting said frames, longitudinal shafts mounted on the rear frame at each side and at its center, the side shafts converging forwardly and having bevel gears at the front ends, and polygonal blocker heads at their rear ends, detachable resilient thinning knives secured to said heads, a transverse shaft mounted on the front end of the rear frame and having bevel gears meshing with the bevel gears of the longitudinal shafts, a pinion on the axle and a pinion loosely mounted on the transverse shaft and adapted to be operably engaged by a clutch on said transverse shaft, a longitudinal beam secured at its front end to the front frame and suspended from the axle, a quadrant controlled lever pivoted to said beam adjacent to the seat of the machine, a connecting rod pivotally connected to the lower end of said lever, a bell crank lever mounted on the rear end of the beam, a link depending from said bell crank lever, a transverse rod mounted on the rear frame and pivotally suspended from the link, whereby the rear end of the rear frame carrying the blocker heads may be raised or depressed at will.

4. In a machine of the class described having an axle and end wheels, the combination of front and rear frames independently suspended from the axle, the rear frame having downwardly deflected side beams and an end beam connecting the same, caster wheels carried by the deflected rear end of the rear frame, longitudinal shafts mounted on the rear frame at each side and at its center, the side shafts converging forwardly and having bevel gears at their front ends and blocker heads at their rear ends, a bevel gear at the front end of the central shaft, said central shaft also carrying at its rear end a blocker head, detachable and adjustable thinning knives carried by said blocker heads, a transverse shaft mounted on the front end of the rear frame and having bevel gears meshing with the bevel gears of the aforesaid longitudinal shafts, a pinion on the axle and a pinion loosely mounted and operably connected therewith by a clutch mechanism, said pinion adapted to mesh with the pinion on the axle, a longitudinal beam connected at its forward end to the front frame and supported from the axle, a quadrant controlled lever pivoted to said beam adjacent to the seat of the machine, a connecting rod pivotally connected to the lower end of said lever, a bell crank lever mounted on the rear end of the beam and pivotally connected to the aforesaid connecting rod, a link depending from said bell crank lever, a transverse rod mounted on the rear frame and pivotally suspended from the link, whereby the rear end of the rear frame carrying the caster wheels and the blocker heads, may be raised or depressed at will.

SAMUEL STONE.

Witnesses:
SHARPLUS WALKER,
M. M. SERRUYS.